US011778280B1

(12) United States Patent
Sharma

(10) Patent No.: US 11,778,280 B1
(45) Date of Patent: Oct. 3, 2023

(54) GEOLOCATION-SPECIFIC SUBTITLE GENERATION

(71) Applicant: Microsoft Technology Licensing, LLC, Redmond, WA (US)

(72) Inventor: Mrinal Kumar Sharma, Hazaribagh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/746,357

(22) Filed: May 17, 2022

(51) Int. Cl.
*H04N 21/488* (2011.01)
*H04N 21/435* (2011.01)
*G06F 16/29* (2019.01)
*H04N 21/44* (2011.01)
*H04N 21/235* (2011.01)

(52) U.S. Cl.
CPC ......... *H04N 21/4884* (2013.01); *G06F 16/29* (2019.01); *H04N 21/235* (2013.01); *H04N 21/435* (2013.01); *H04N 21/44008* (2013.01)

(58) Field of Classification Search
CPC ......... H04N 21/85406; H04N 1/32309; H04N 21/2743; H04N 13/117; H04N 19/124; H04N 13/344; H04N 19/513; H04N 21/41422
See application file for complete search history.

(56) References Cited

U.S. PATENT DOCUMENTS

| 8,914,276 B2 | 12/2014 | Reitan |
| 9,104,661 B1 | 8/2015 | Evans |
| 10,656,797 B1 * | 5/2020 | Alvi ................... G06F 3/04842 |

(Continued)

FOREIGN PATENT DOCUMENTS

| CA | 3038797 A1 | 4/2018 |
| CN | 103810276 A | 5/2014 |

(Continued)

OTHER PUBLICATIONS

"Model 3 Surprise", Retrieved from: https://www.youtube.com/watch?v=e_Wnwb_cC3g, Dec. 8, 2018, 4 Pages.

(Continued)

*Primary Examiner* — Samira Monshi
(74) *Attorney, Agent, or Firm* — International IP Law Group, PLLC

(57) ABSTRACT

A method for generating geolocation-specific subtitles for a video is implemented via a computing system including a processor. The method includes accessing, via the processor, a video including an embedded subtitle file, extracting the subtitle file from the video, extracting unit values from the subtitle file, and extracting a geolocation of a user executing a video streaming application. The method also includes converting the unit values within the subtitle file to geolocation-specific unit values using a unit conversion map, where the geolocation-specific unit values correspond to the extracted geolocation of the user. The method further includes streaming the video with subtitles from the subtitle file on a video GUI of the video streaming application and, simultaneously with the streaming of the video, surfacing the geolocation-specific unit values within a unit conversion GUI of the video streaming application that is surfaced on top of the video GUI.

20 Claims, 6 Drawing Sheets

(56) References Cited

U.S. PATENT DOCUMENTS

| | | |
|---|---|---|
| 10,671,147 B2 | 6/2020 | Rotem et al. |
| 10,929,681 B2 | 2/2021 | Min et al. |
| 10,930,166 B2 | 2/2021 | Schlender et al. |
| 10,950,254 B2 | 3/2021 | Vaughn et al. |
| 2010/0095345 A1 | 4/2010 | Tran et al. |
| 2013/0027514 A1 | 1/2013 | Cho et al. |
| 2014/0143061 A1* | 5/2014 | Abhyanker ............ G06Q 50/01 705/14.58 |
| 2015/0081672 A1 | 3/2015 | Wolf et al. |
| 2022/0312059 A1* | 9/2022 | Laul .................... H04N 21/858 |

FOREIGN PATENT DOCUMENTS

| | | |
|---|---|---|
| CN | 103250410 B | 6/2018 |
| RU | 2668721 C1 | 10/2018 |

OTHER PUBLICATIONS

Jeff, "Best Running Shoes—Stability, Cheap, Cushioned, Long Distance (Updated)", Retrieved from: https://www.youtube.com/watch?v=CMVFNp5zRgQ, Nov. 29, 2018, 8 Pages.

Wicaksono, et al., "Translation Analysis of Subtitle from English into Indonesian in The Raid 2 Movie", In Journal of English Literature, Language and Education vol. 7, Issue 2, Dec. 2019, pp. 79-85.

"International Search Report and Written Opinion Issued in PCT Application No. PCT/US23/013455", dated Apr. 13, 2023, 15 Pages.

* cited by examiner

US 11,778,280 B1

GEOLOCATION-SPECIFIC SUBTITLE GENERATION

BACKGROUND

The present disclosure relates to video subtitles. In particular, the present disclosure relates to generating geolocation-specific subtitles for streaming videos.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for generating geolocation-specific subtitles for a video is described. The method is implemented in a computing system including a processor. The method includes accessing, via the processor, a video including an embedded subtitle file, extracting the subtitle file from the video, and extracting unit values from the subtitle file. The method also includes extracting a geolocation of a user executing a video streaming application and converting the unit values within the subtitle file to geolocation-specific unit values using a unit conversion map, where the geolocation-specific unit values correspond to the extracted geolocation of the user. The method further includes streaming the video with subtitles from the subtitle file on a video graphical user interface (GUI) of the video streaming application and, simultaneously with the streaming of the video, surfacing the geolocation-specific unit values within a unit conversion GUI of the video streaming application that is surfaced on top of the video GUI.

In another embodiment, a computing system is described. The computing system includes a processor and a computer-readable storage medium operatively coupled to the processor. The computer-readable storage medium includes computer-executable instructions that, when executed by the processor, cause the processor to access a video including an embedded subtitle file, extract the subtitle file from the video, and extract unit values from the subtitle file. The computer-readable storage medium also includes computer-executable instructions that, when executed by the processor, cause the processor to extract a geolocation of a user executing a video streaming application and convert the unit values within the subtitle file to geolocation-specific unit values using a unit conversion map, where the geolocation-specific unit values correspond to the extracted geolocation of the user. The computer-readable storage medium further includes computer-executable instructions that, when executed by the processor, cause the processor to stream the video with subtitles from the subtitle file on a video GUI of the video streaming application and, simultaneously with the streaming of the video, surface the geolocation-specific unit values within a unit conversion GUI of the video streaming application that is surfaced on top of the video GUI.

In another embodiment, a computer-readable storage medium is described. The computer-readable storage medium includes computer-executable instructions that, when executed by a processor, cause the processor to access a video including an embedded subtitle file, extract the subtitle file from the video, and extract unit values from the subtitle file. The computer-readable storage medium also includes computer-executable instructions that, when executed by the processor, cause the processor to extract a geolocation of a user executing a video streaming application and convert the unit values within the subtitle file to geolocation-specific unit values using a unit conversion map, where the geolocation-specific unit values correspond to the extracted geolocation of the user. The computer-readable storage medium further includes computer-executable instructions that, when executed by the processor, cause the processor to stream the video with subtitles from the subtitle file on a video GUI of the video streaming application and, simultaneously with the streaming of the video, surface the geolocation-specific unit values within a unit conversion GUI of the video streaming application that is surfaced on top of the video GUI.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1A:
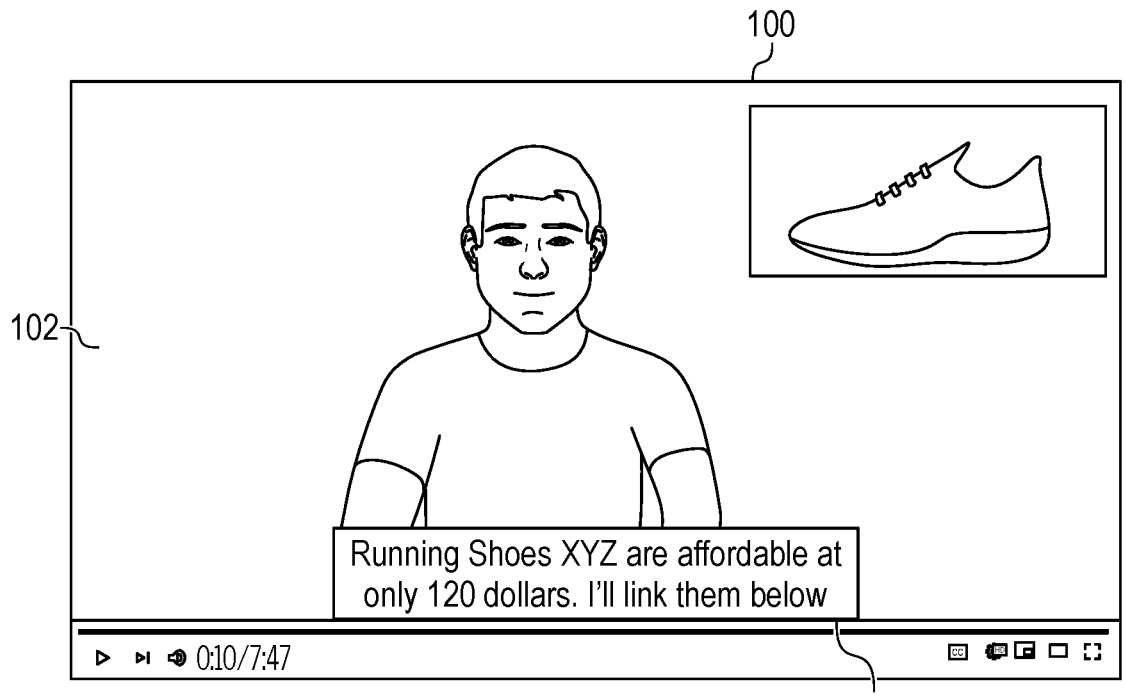
FIG. 1A is a schematic view of a video GUI of a video streaming application surfacing a marketing video including video subtitles as supported by conventional approaches, i.e., with the unit values within the video subtitles surfaced according to the original units without any adaptation or modification based on the user's specific geolocation.

In today's marketing environment, companies are constantly competing to deliver the most engaging, shareable marketing content, with new trends arising on a regular basis. Standing out among these trends is video marketing, which aims to increase consumers' engagement by incorporating video content into marketing material. Statistically, more than 50% of internet users now typically search for videos related to a product or service before making a purchasing decision. As a result, videos now top the list of all marketing content.

In general, modern marketing content aims to engage consumers using targeted material that is personalized to individual users and/or groups of users. In particular, with the advancement of modern technology, companies are now turning their attention to the utilization of users' geolocations to provide tailored marketing experiences, where the term "geolocation" refers to the location of a user as determined based on GPS coordinates measured by the user's GPS-enabled computing system. Delivering targeted, personalized marketing content in this manner often results in the effective engagement of previously stagnant or under-performing groups of consumers, potentially resulting in increased sales of the marketed goods and/or services.

However, such geolocation-specific targeted marketing is still lacking in the video marketing environment, with conventional video streaming applications failing to realize the full potential of modern GPS technology. In particular, conventional video streaming applications fail to adequately adapt video subtitles based on users' geolocations, where the term "subtitle" is used herein to refer to any type of text that is surfaced with respect to a video in order to translate or transcribe the dialogue, narrative, or other audio content presented in the video, including text that is typically referred to as "closed captions." In general, video subtitles represent a powerful marketing tool that boosts the number of views and shares for marketing videos. Conventional video streaming applications generally include an auto-translator feature that translates video subtitles from one language to another language based on the geolocations of specific users. More specifically, conventional video streaming applications typically save the SubRip Subtitle (SRT) file in multiple languages and embed the geolocation-specific SRT files in the respective videos. When the video is streamed, the video streaming application then determines the geolocation of the user, selects the language-appropriate SRT file, and streams the video with the selected SRT file.

Notably, however, conventional video streaming applications fail to convert the standard formats used in SRT files based on different geolocations. In particular, subtitles commonly include geolocation-specific units, such as units relating to currency, time, distance, speed, temperature, and/or other parameters. Moreover, conversion between different units is generally not intuitive to users. For example, when a person located in India views a marketing video created in the United States through a video streaming application, it may be difficult for the user in India to determine the actual price of the corresponding product/service if the video and corresponding subtitles report the price in terms of United States dollars (USD) instead of Indian rupees (INR). Moreover, the failure of conventional video streaming applications to adapt such units based on users' geolocations results in a degraded video streaming experience, with remotely-located users having to alternate between watching the video on the video streaming application and opening a separate unit conversion website or tool to determine unit conversions that provide meaning and context to the videos. For example, when the user in India views the subtitle including the price of the product/service in USD, the user may pause the video, switch to an internet browser, open a currency conversion website, and convert the price in USD to the price in INR. Clearly, this is inconvenient for the user and may result in the user failing to fully engage with the video. Other exemplary scenarios in which the failure of conventional video streaming applications to adequately account for users' geolocations may affect users' ability to fully engage with the corresponding videos may include (but are not limited to) video subtitles including temperature units (e.g., Celsius in India as compared to Fahrenheit in the United States), distance units (e.g., kilometers in India as compared to miles in the United States), weight units (e.g., kilograms in India as compared to pounds in the United States), and/or any other types of units that vary between two different geolocations.

Therefore, the present techniques address these and other issues by providing for the generation of geolocation-specific subtitles for streaming videos. More specifically, the present techniques provide for the conversion of unit values within subtitle files (e.g., SRT files) such that the unit values surfaced with respect to the video subtitles are tailored to each user's specific geolocation. According to embodiments described herein, this may be accomplished using a unit conversion map including base conversion values for converting unit values corresponding to a wide range of parameters, such as, for example, currency, time, distance, speed, temperature, and the like.

In practice, the subtitle file (e.g., SRT file) may be extracted from a particular video that has been selected for streaming via a video streaming application. Alternatively, for embodiments in which the subtitle file is not present, a speech-to-text conversion tool may be used to produce a subtitle file (e.g., a textual subtitle file, such as a TXT file) for the video. The subtitle file may then be analyzed to extract any unit values that are present within the video. The geolocation of the user of the corresponding computing system is then extracted using the IP address. Alternatively, for embodiments in which access to the IP address is not permitted, the user's geolocation may be extracted from the user identification (ID) information that was provided when the user made an account with the video streaming application. The unit conversion map may then be utilized to convert the unit values within the subtitle file to geolocation-specific unit values that are consistent with the user's geolocation. Finally, the video may be streamed with the converted, geolocation-specific unit values obtained using the unit conversion map. In various embodiments, this is accomplished by surfacing a separate unit conversion graphical user interface (GUI) on top of the video GUI surfacing the overall video such that the converted unit values are shown adjacent to (e.g., above, below, or next to) the original video subtitles, as described further herein.

In some embodiments, various converted unit values for different geolocations are saved with respect to the corresponding subtitle file such that the video can be subsequently streamed with respect to the different geolocations. For example, the application service provider that provides the video streaming application may provide for the storage of the video, the SRT file (or other type of subtitle file), and the corresponding converted geolocation-specific unit values within one or more servers (and/or one or more corresponding storage devices or databases) that are operated by the application service provider. Additionally or alternatively, in some embodiments, the entire geolocation-specific subtitle generation process is performed in real-time (or near-real-time), enabling the user to view converted geolocation-specific unit values for live videos, such as videos of meetings, conferences, live television programs, and the like.

As used herein, the term "video streaming application" refers to any application that supports video streaming, regardless of whether the primary purpose of the application relates to video streaming. As will be appreciated by those skilled in the art, the term therefore encompasses a wide range of applications, including, for example, e-commerce applications that include video streaming capabilities for advertising particular products and/or services, typical video streaming applications that are intended primarily for streaming video content, social media applications, networking applications, communication applications, entertainment applications, fitness applications, gaming applications, and the like. As a non-limiting example, if the application service provider is Microsoft Corporation, the video streaming application described herein may include (but is not limited to) any Microsoft application that includes video streaming capabilities, including (but not limited to) Microsoft® Teams®, Microsoft® Viva®, Microsoft® SharePoint®, and/or Microsoft® Yammer® (among others).

While embodiments are primarily described herein with respect to the utilization of the present techniques to provide geolocation-specific subtitles for marketing videos (e.g., within the e-commerce domain), those skilled in the art will appreciate that the present techniques can be utilized to provide geolocation-specific subtitles for various different types of videos. As examples, the present techniques can also be used to provide geolocation-specific subtitles for educational videos (e.g., within the e-learning domain), entertainment videos, conferencing videos, and the like. Generally speaking, the present techniques are useful for providing geolocation-specific subtitles for any video that includes unit-related information and is likely to be shared with users in diverse locales.

Those skilled in the art will appreciate that the geolocation-specific subtitle generation techniques described herein provide numerous advantages over conventional techniques relating to video subtitles. As an example, the present techniques boost user engagement and provide an enhanced viewing experience. In particular, such techniques enable users to absorb video content more easily by intelligently converting unit values within video subtitles based on the users' specific geolocations. As another example, the present techniques provide real-time video subtitle unit conversion such that users are able to understand the unit values within videos in real-time without having to perform any independent unit conversions, thus saving users time and ensuring that they are able to fully engage with the videos. As another example, the present techniques are particularly useful in the e-commerce domain, enabling consumers to make purchasing decisions based on marketing videos more quickly and effectively by providing them with product/service details that are tailored to their specific geolocation.

Some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

Figure 1B:
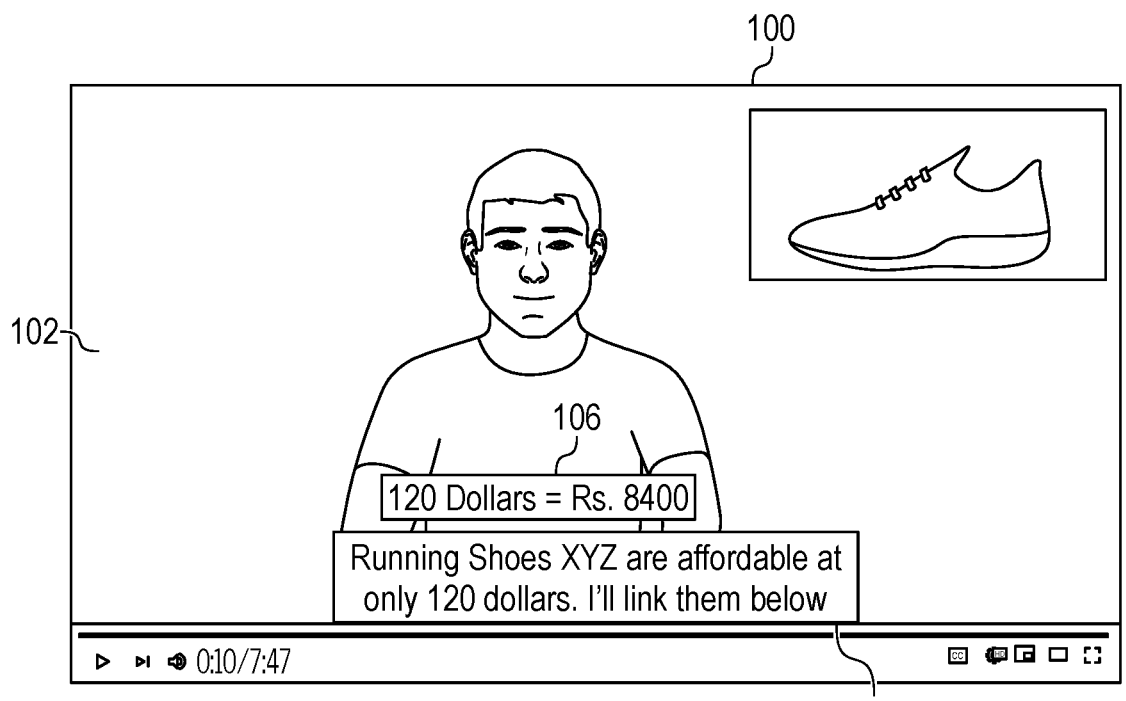
FIG. 1B is a schematic view of the video GUI of the video streaming application surfacing the marketing video including the video subtitles as well as converted geolocation-specific unit values surfaced in a separate unit conversion GUI according to embodiments described herein.

Turning now to additional details regarding the geolocation-specific subtitle generation techniques described herein, FIGS. 1A and 1B illustrate an exemplary implementation of the present techniques. In particular, FIGS. 1A and 1B depict an exemplary implementation in which a user located in India is watching a marketing video titled "Best Running Shoes" to determine the best running shoes to purchase. FIG. 1A is a schematic view of a video GUI 100 of a video streaming application surfacing a marketing video 102 including video subtitles 104 as supported by conventional approaches, i.e., with the unit values within the video subtitles 104 surfaced according to the original units without any adaptation or modification based on the user's specific geolocation. More specifically, as shown in FIG. 1A, the video subtitles 104 state: "Running Shoes XYZ are affordable at only 120 dollars. I'll link them below." Therefore, the price of the running shoes is surfaced as "120 dollars" within the video subtitles 104, even though the user is located in India and would benefit from viewing the price in a format that is native to the user, i.e., INR rather than USD. As a result, the user may pause the video, switch to an internet browser, open a currency conversion website, and convert the price in USD to the price in INR. Clearly, this is inconvenient for the user and prevents the user from being able to adequately assess and/or compare the price of the shoes in real-time while viewing the marketing video 102.

FIG. 1B is a schematic view of the video GUI 100 of the video streaming application surfacing the marketing video 102 including the video subtitles 104 as well as converted geolocation-specific unit values surfaced in a separate unit conversion GUI 106 according to embodiments described herein. More specifically, as shown in FIG. 1B, the price of the running shoes in USD is automatically converted to the price of the running shoes in INR (i.e., $120=Rs. 8400) using the unit conversion map described herein. The unit conversion GUI 106 is then automatically surfaced adjacent to (i.e., above, in this example) the standard video subtitles 104 to enable the user to view the currency value in the user's native format, as determined based on the user's geolocation. Moreover, in various embodiments, the unit conversion GUI 106 is surfaced in real-time without requiring any time, effort, or intervention on the part of the user.

Figure 2A:
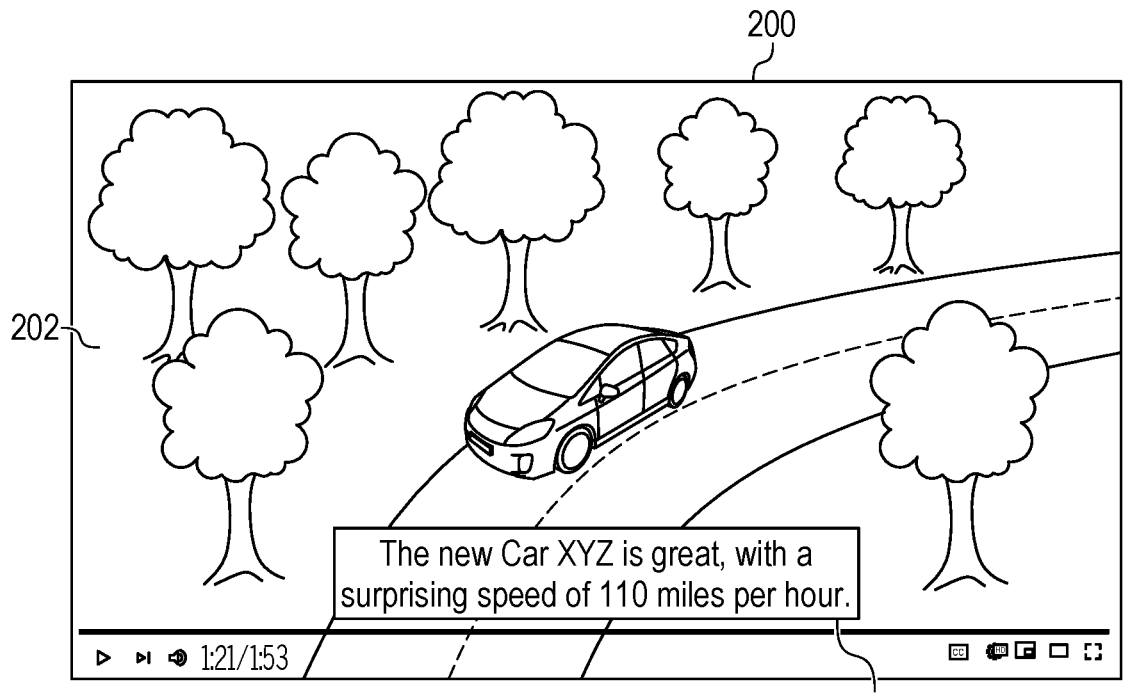
FIG. 2A is a schematic view of a video GUI of a video streaming application surfacing a marketing video including video subtitles as supported by conventional approaches, i.e., with the unit values within the video subtitles surfaced according to the original units without any adaptation or modification based on the user's specific geolocation.
Figure 2B:
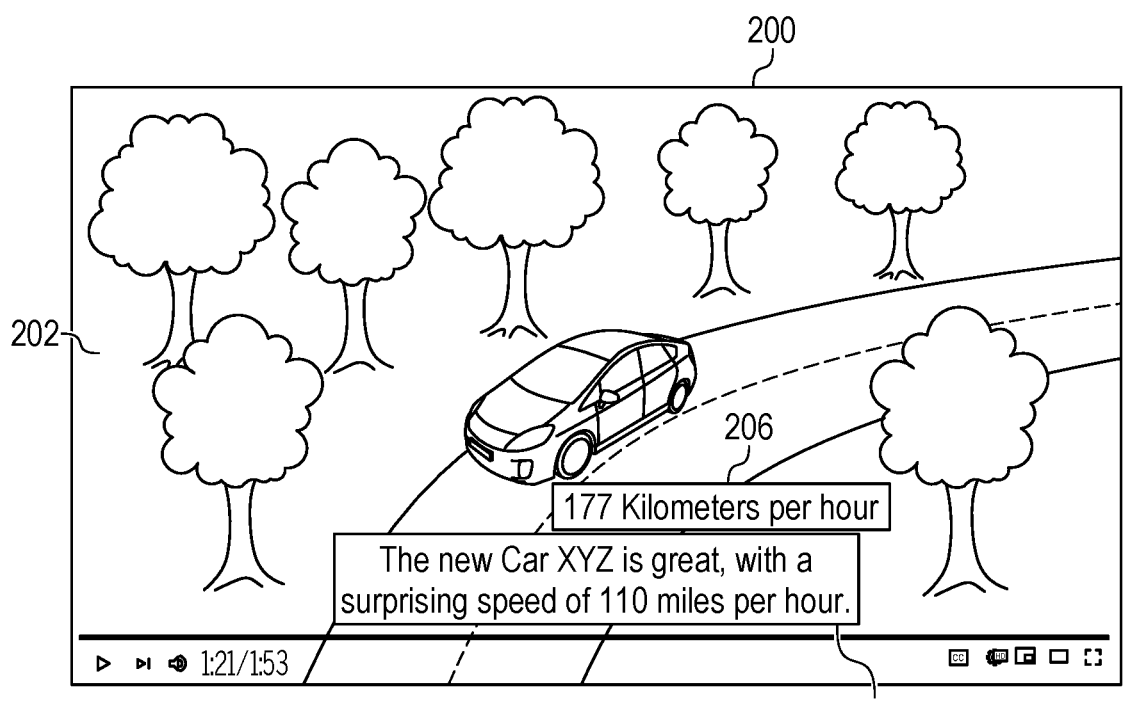
FIG. 2B is a schematic view of the video GUI of the video streaming application surfacing the marketing video including the video subtitles as well as converted geolocation-specific unit values surfaced in a separate unit conversion GUI according to embodiments described herein.

FIGS. 2A and 2B illustrate another exemplary implementation of the present techniques. In particular, FIGS. 2A and 2B depict an exemplary implementation in which a user located in India is watching a marketing video related to a particular type of car. FIG. 2A is a schematic view of a video GUI 200 of a video streaming application surfacing a marketing video 202 including video subtitles 204 as supported by conventional approaches, i.e., with the unit values within the video subtitles 204 surfaced according to the original units without any adaptation or modification based on the user's specific geolocation. More specifically, as shown in FIG. 2A, the video subtitles 204 state: "Car XYZ is great, with a surprising speed of 110 miles per hour." Therefore, the speed of the advertised vehicle is displayed as "110 miles per hour" within the video subtitles 204, even though the user is located in India and would benefit from viewing the price in a format that is native to the user, i.e., kilometers per hour rather than miles per hour. As a result, the user may pause the video, switch to an internet browser, open a currency conversion website, and convert the speed in miles per hour to the speed in kilometers per hour. This is inconvenient for the user and prevents the user from being able to adequately assess and/or compare the speed of the advertised vehicle in real-time while viewing the marketing video 202.

FIG. 2B is a schematic view of the video GUI 200 of the video streaming application surfacing the marketing video 202 including the video subtitles 204 as well as converted geolocation-specific unit values surfaced in a separate unit conversion GUI 206 according to embodiments described herein. More specifically, as shown in FIG. 2B, the speed of the car in miles per hour is automatically converted to the speed of the car in kilometers per hour (i.e., 110 miles per hour =177 kilometers per hour) using the unit conversion map described herein. The unit conversion GUI 206 is then automatically surfaced adjacent to (i.e., above, in this example) the standard video subtitles 204 to enable the user to view the currency value in the user's native format, as determined based on the user's geolocation. In addition, in this exemplary implementation, the original unit values that have been converted are highlighted (e.g., underlined) with respect to the standard video subtitles 204 to enable the user to easily understand the relationship between the converted geolocation-specific unit values in the unit conversion GUI 206 and the original unit values in the standard video subtitles 204. Furthermore, as described above, the unit conversion GUI 206 may be surfaced in real-time without requiring any time, effort, or intervention on the part of the user.

Those skilled in the art will appreciate that the exemplary implementations of the geolocation-specific subtitle generation techniques described with respect to FIGS. 1A, 1B, 2A, and 2B are for illustrative purposes only. In practice, the techniques described herein may be implemented in any other suitable manner to achieve any other suitable results, depending on the details of the particular implementation.

Figure 3:
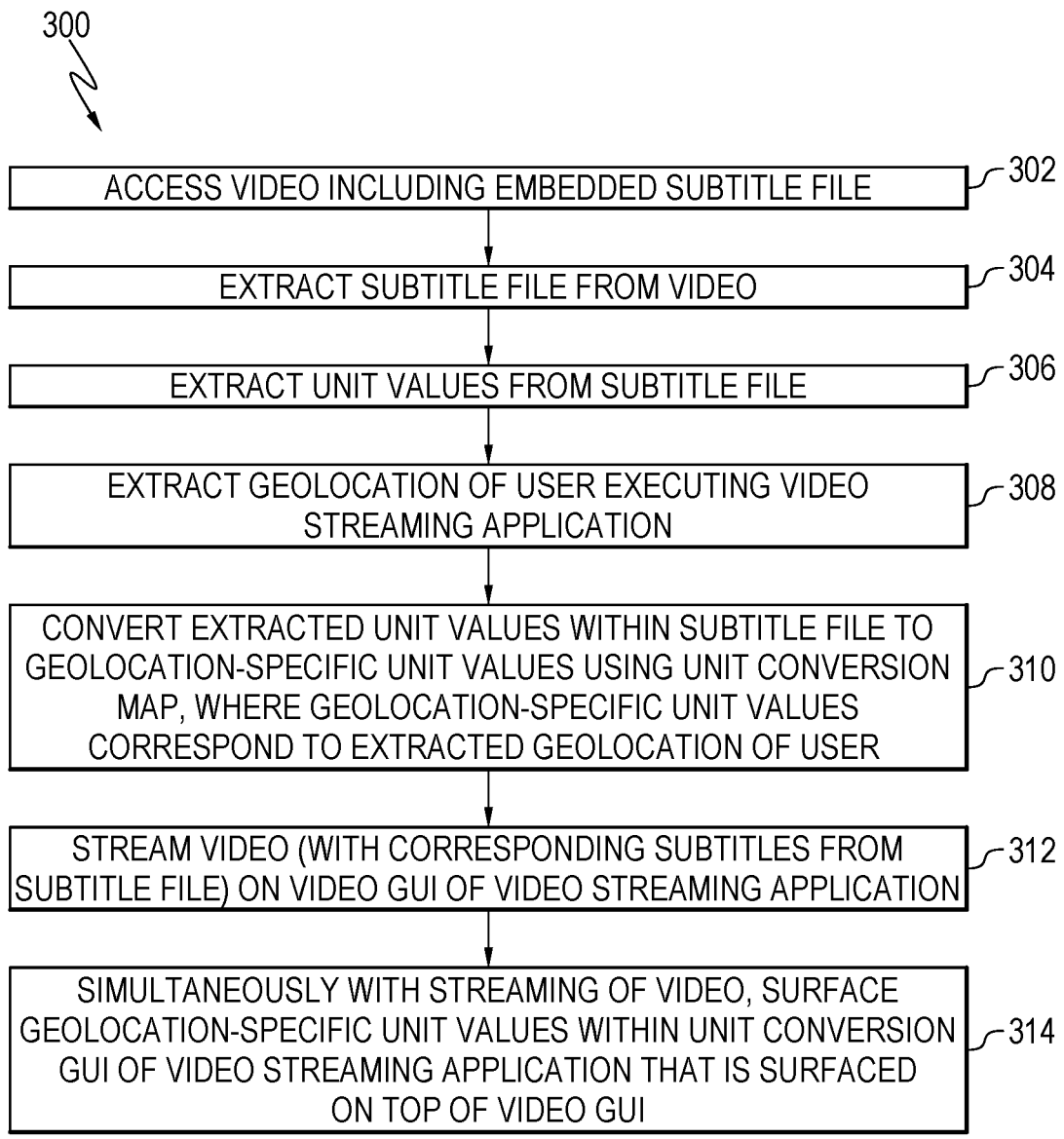
FIG. 3 is a process flow diagram of an exemplary method for generating geolocation-specific subtitles for a video according to embodiments described herein.

FIG. 3 is a process flow diagram of an exemplary method 300 for generating geolocation-specific subtitles for a video according to embodiments described herein. The method 300 is executed via one or more computing systems, such as the exemplary computing system described with respect to FIG. 4. In particular, in various embodiments, the computing system(s) implementing the method 300 include computing system(s) or server(s) that are run by an application service provider that provides for the execution of one or more video streaming applications on remote computing systems. The computing system(s) include one or more processors and one or more computer-readable storage media including computer-executable instructions that, when executed by the processor(s), cause the processor(s) to perform the blocks of the method 300. An exemplary embodiment of such computer-readable storage media is described with respect to FIG. 6. Moreover, in various embodiments, the method 300 is executed within the context of a network environment including one or more application service provider computing system(s)/server(s), as described further with respect to the exemplary network environment of FIG. 5.

In various embodiments, prior to proceeding to block 302, the method 300 includes generating a unit conversion map including computer-readable instructions for converting between units corresponding to various parameters, such as, for example, currency, time, distance, speed, temperature, and the like. In particular, the unit conversion map may include a base value (or conversion factor) for converting between different units. As an example, the base value for converting from miles to kilometers is 1.609344, since 1 mile =1.609344 kilometers. Accordingly, the unit conversion map may include base values (or conversion factors) for a wide range of different units corresponding to a wide range of parameters. Furthermore, the unit conversion map also include computer-readable instructions regarding which units correspond to which geolocations. As an example, the unit conversion map may specify that the United States utilizes the imperial system of measurement, while almost every other country in the world utilizes the metric system.

Once the unit conversion map has been generated, the method 300 may begin at block 302, at which a video including an embedded subtitle file is accessed via the processor of the computing system that is implementing the method 300. For example, in some embodiments, the video is uploaded to the computing system via a network. In such embodiments, the video may be a pre-recorded video that is uploaded to the computing system for future streaming, or the video may be a live video that is to be streamed in real-time.

At block 304, the subtitle file is extracted from the video. In some embodiments, this includes extracting the subtitle file (e.g., the SRT file) from the video metadata, if such subtitle file is present. Alternatively, for embodiments in which the subtitle file is not present, a subtitle file (e.g., a textual subtitle file, such as a TXT file) is generated for the video by performing automatic speech-to-text conversion.

At block 306, the subtitle file is automatically analyzed to extract unit values from the subtitle file, where the term "unit value" is used herein to refer to both the value of the parameter itself and the type of unit utilized to express the value of the parameter (e.g., in the case of 120 miles per hour, 120 is the value of the speed parameter and miles per hour is the type of unit utilized to express such speed parameter). In various embodiment, this includes automatically searching the text within the subtitle file for common unit values using a number of predefined, regular expression (regex) search strings. Additionally or alternatively, in various embodiments, this includes automatically analyzing the text within the subtitle file using natural language processing techniques to extract phrases relating to parameters that are typically expressed in terms of units.

At block 308, the geolocation of the user corresponding to the computing system executing the video streaming application is extracted. In some embodiments, such extraction of the user's geolocation is accomplished by accessing the IP address corresponding to the user's computing system to extract a current geolocation of the user. For embodiments in which the video streaming application is executed on the computing system implementing the method 300, the extracted IP address corresponds to the computing system implementing the method 300. Alternatively, for embodiments in which the computing system implementing the method 300 causes the execution of the video streaming application, the streaming of the video, and the surfacing of the geolocation-specific unit values on a remote computing system that is operated by the user, the IP address corresponds to such remote computing system. Moreover, in some embodiments (e.g., for embodiments in which access to the IP address is not permitted), the extraction of the user's geolocation may be accomplished by analyzing user ID information that was provided by the user when the user created an account with the video streaming application. This may result in the extraction of the user's native geolocation (e.g., the user's country of origin).

At block 310, the unit values within the subtitle file are converted to geolocation-specific unit values using the unit conversion map, where the geolocation-specific unit values correspond to the extracted geolocation of the user. For example, referring to the exemplary embodiment of FIGS. 1A and 1B, the original unit value of 120 dollars is converted to the geolocation-specific unit value of 8400 rupees because the user's extracted geolocation is India.

At block 312, the video (with the subtitles from the corresponding subtitle file) is streamed on a video GUI of the video streaming application. In addition, at block 314, simultaneously with the streaming of the video, the geolocation-specific unit values are surfaced within a unit conversion GUI of the video streaming application that is surfaced on top of the video GUI and adjacent to the corresponding subtitles. In various embodiments, the unit conversion GUI including the geolocation-specific unit values is surfaced adjacent to (e.g., above, below, or next to) the corresponding subtitles within the video GUI. Moreover, in some embodiments, the original unit values within the subtitles are also visually highlighted to indicate the manner in which the geolocation-specific unit values correspond to the subtitles. For example, referring to the exemplary embodiment of FIGS. 2A and 2B, the original unit value of 110 miles per hour is underlined in the original subtitles surfaced on the video GUI, thus showing the correlation between the geolocation-specific unit value (i.e., 177 kilometers per hour) and the original unit value (i.e., 110 miles per hour).

In some embodiments, the video is a live video, and the method is performed in real-time to enable the video to be streamed with the geolocation-specific subtitles in real-time, without causing any substantial delay. In other embodiments, the method 300 may be used to automatically generate a number of geolocation-specific unit values for a number of corresponding geolocations using the unit conversion map, and the generated geolocation-specific unit values may be stored with respect to the subtitle file in preparation for the subsequent streaming of the video from various different geolocations.

The block diagram of FIG. 3 is not intended to indicate that the blocks of the method 300 are to be executed in any particular order, or that all of the blocks of the method 300 are to be included in every case. Moreover, any number of additional blocks may be included within the method 300, depending on the details of the specific implementation. For example, in various embodiments, the method 300 also includes activating or deactivating the geolocation-specific subtitle generation functionality of the video streaming application based at least on (e.g., responsive to) user input received via the video GUI. In such embodiments, the activation of the geolocation-specific subtitle generation functionality causes the surfacing of the geolocation-specific unit values with the unit conversion GUI, and the deactivation of the geolocation-specific subtitle generation functionality causes the method 300 to terminate prior to the surfacing of the geolocation-specific unit values within the unit conversion GUI.

Figure 4:
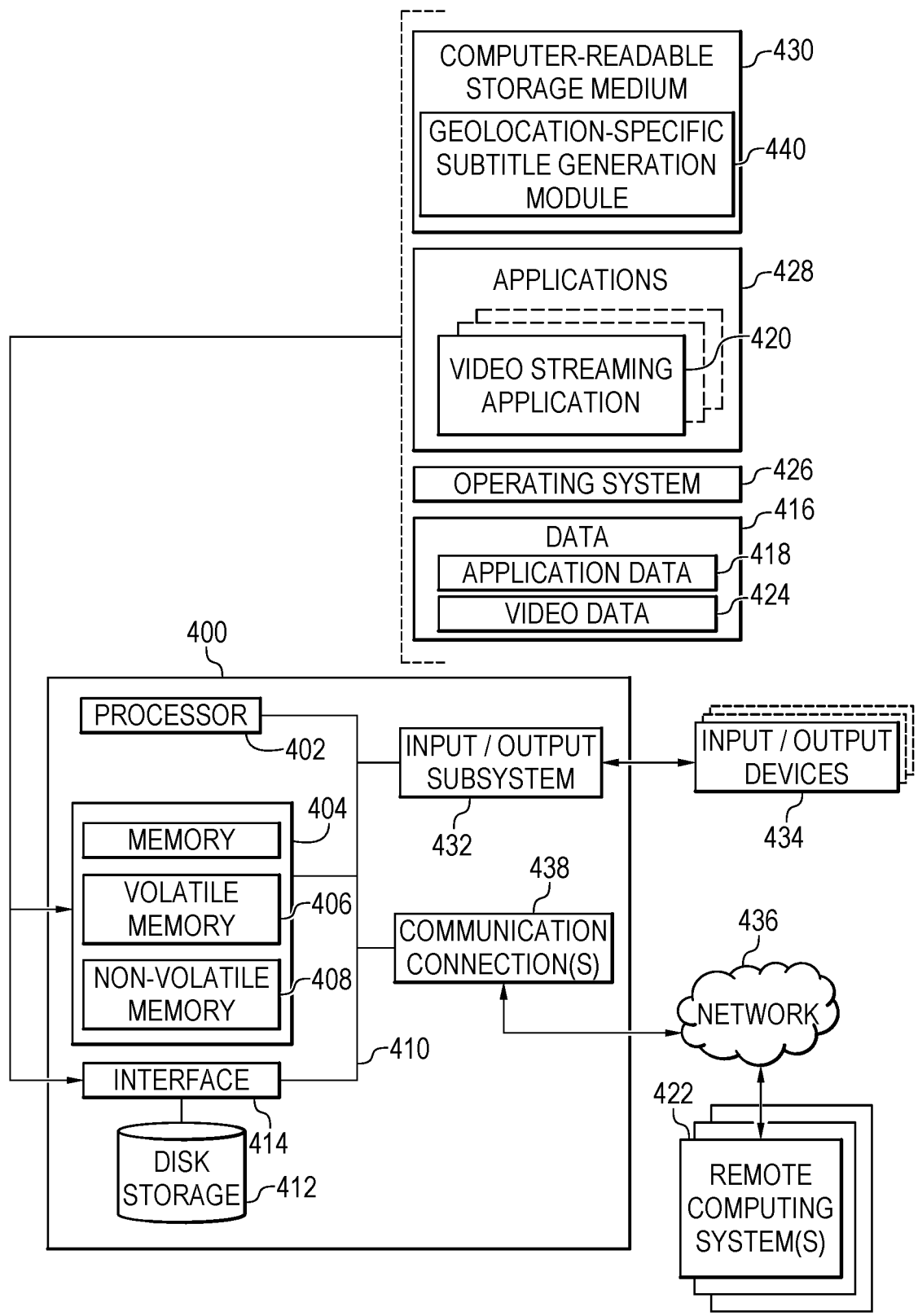
FIG. 4 is a block diagram of an exemplary computing system for implementing the geolocation-specific subtitle generation techniques described herein.

FIG. 4 is a block diagram of an exemplary computing system 400 for implementing the geolocation-specific subtitle generation techniques described herein. The exemplary computing system 400 includes a processor 402 and a memory 404. The processor 402 may include any suitable type of processing unit or device, such as, for example, a single-core processor, a multi-core processor, a computing cluster, or any number of other configurations. Moreover, the processor 402 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the computing system 400, are interconnected by way of a system bus 410. The system bus 410 can be implemented using any suitable bus architecture known to those skilled in the art.

According to the embodiment shown in FIG. 4, the computing system 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 function as one or more databases that are used to store data 416 relating to the techniques described herein. Such data 416 may include, but are not limited to, application data 418 obtained from the execution of one or more video streaming application(s) 420 on various remote computing systems 422. According to embodiments described herein, such application data 418 may include data relating to a geolocation-specific subtitle generation functionality of the video streaming application(s) 420, as described herein. Such data 416 may also include, but are not limited to, video data 424 corresponding to any number of videos that are streamed using the video streaming application(s) 420. According to embodiments described herein, such video data 424 may include data relating to the generation of geolocation-specific subtitles within any of the videos.

Those skilled in the art will appreciate that FIG. 4 describes software that acts as an intermediary between a user of the computing system 400 and the basic computing resources described with respect to the operating environment of the computing system 400. Such software includes an operating system 426. The operating system 426, which may be stored on the disk storage 412, acts to control and allocate the computing resources of the computing system 400. Moreover, system applications 428, including the video streaming application(s) 420, take advantage of the management of the computing resources by the operating system 426 through one or more program modules stored within a computer-readable storage medium (or media) 430, as described further herein.

The computing system 400 also includes an input/output (I/O) subsystem 432. The I/O subsystem 432 includes a set of hardware, software, and/or firmware components that enable or facilitate inter-communication between the user of the computing system 400 and the processor 402 of the computing system 400. During operation of the computing system 400, the I/O subsystem 432 enables the user to interact with the computing system 400 through one or more I/O devices 434. Such I/O devices 434 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 402 through the system bus 410 via one or more interface ports (not shown) integrated within the I/O subsystem 432. Such interface ports may include, for example, a serial port, a parallel port, a game port, and/or a universal serial bus (USB).

In addition, such I/O devices 434 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 400 and to output information from the computing system 400 to a corresponding output device. Moreover, in some embodiments, the one or more output devices or channels are accessible via one or more adapters (not shown) integrated within the I/O subsystem 432.

In various embodiments, the computing system 400 is communicably coupled to any number of remote computing systems 422. The remote computing system(s) 422 may include, for example, one or more personal computers (e.g., desktop computers, laptop computers, or the like), one or more tablets, one or more mobile devices (e.g., mobile phones), one or more network PCs, and/or one or more workstations. As an example, in some embodiments, the computing system 400 is an application service provider server hosting the video streaming application(s) 420 in a networked environment using logical connections to the remote computing systems 422. In such embodiments, the computing system 400 provides for the execution of the video streaming application(s) 420 on the remote computing systems 422 with the enhanced functionality provided by the geolocation-specific subtitle generation techniques described herein.

In various embodiments, the remote computing systems 422 are logically connected to the computing system 400 through a network 436 and then connected via a communication connection 438, which may be wireless. The network 436 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 438 includes the hardware/software employed to connect the network 436 to the bus 410. While the communication connection 438 is shown for illustrative clarity as residing inside the computing system 400, it can also be external to the computing system 400. The hardware/software for connection to the network 436 may include, for example, internal and external technologies, such as mobile phone switches, modems including regular telephone grade modems, cable modems and DSL modems, ISDN adapters, and/or Ethernet cards.

As described above, the system applications 428, such as the video streaming application(s) 420, take advantage of the management of the computing resources by the operating system 426 through one or more program modules stored within the computer-readable storage medium (or media) 430. In some embodiments, the computer-readable storage medium 430 is integral to the computing system 400, in which case it may form part of the memory 404 and/or the disk storage 412. In other embodiments, the computer-readable storage medium 430 is an external device that is connected to the computing system 400 when in use.

In various embodiments, the one or more program modules stored within the computer-readable storage medium 430 include program instructions or code that may be executed by the processor 402 to perform various operations. In various embodiments, such program modules include, but are not limited to, a geolocation-specific subtitle generation module 440 that causes the processor 402 to perform operations that result in the execution of the geolocation-specific subtitle generation techniques provided herein, as described with respect to the method 300 of FIG. 3, for example. In particular, in various embodiments, the execution of the video streaming application(s) 420 in conjunction with the geolocation-specific subtitle generation module 440 may result in the display of streaming videos with geolocation-specific subtitles.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the one or more program modules/submodules may be partially, or entirely, implemented in hardware and/or in the processor 402. For example, the functionality may be implemented with an application specific integrated circuit, in logic implemented in the processor 402, or in any other device.

Figure 5:
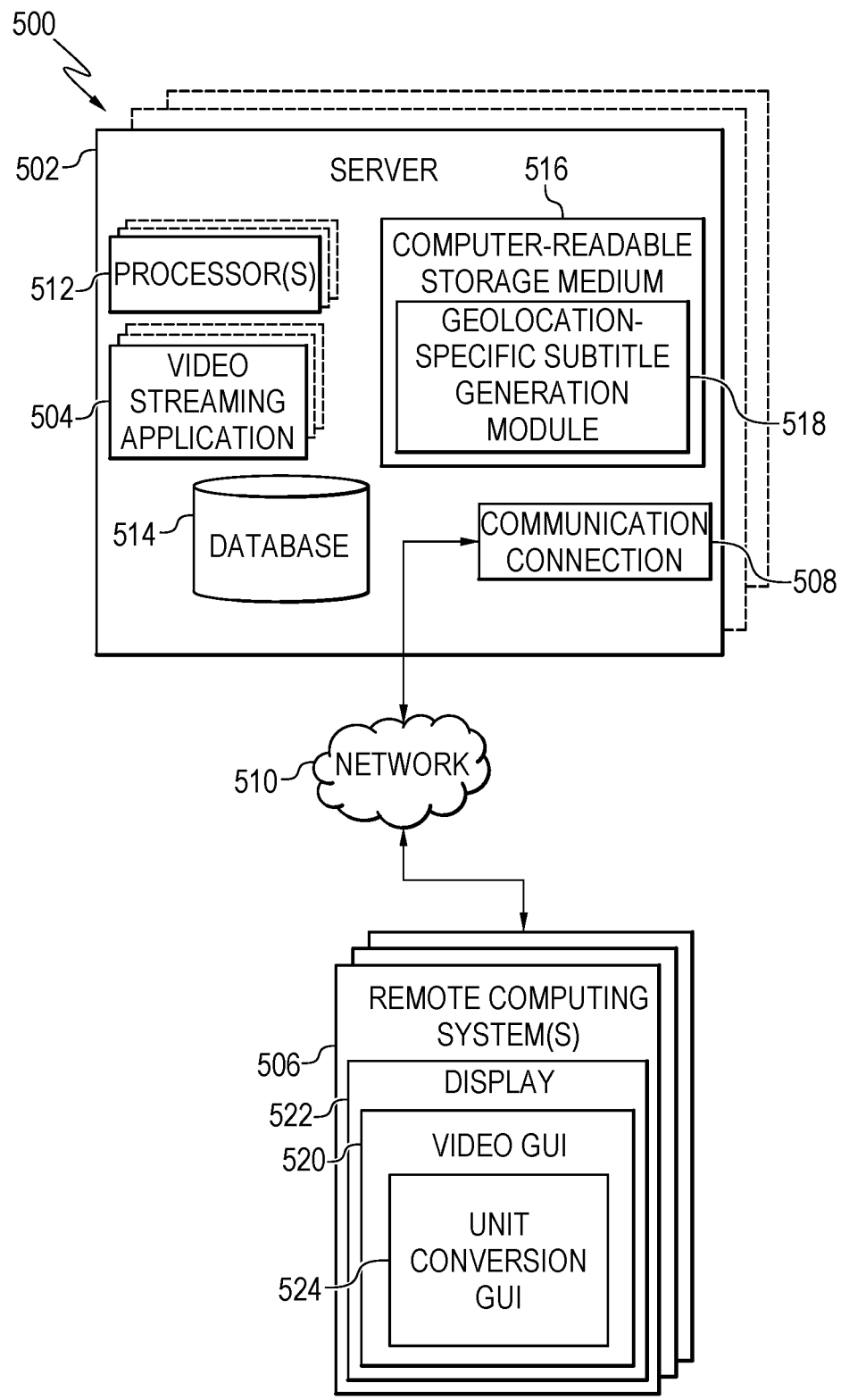
FIG. 5 is a block diagram of an exemplary network environment for implementing the geolocation-specific subtitle generation techniques described herein.

FIG. 5 is a block diagram of an exemplary network environment 500 for implementing the geolocation-specific subtitle generation techniques described herein. As shown in FIG. 5, the network environment 500 includes one or more server(s) 502 that provide for the execution of the techniques described herein. In various embodiments, the server(s) 502 are operated by an application service provider that provides for the execution of one or more video streaming application(s) 504. In addition, the network environment 500 may include any number of remote computing systems 506.

In various embodiments, the server(s) 502 are configured to communicate with the remote computing system(s) 506 via a communication connection 508 and a corresponding network 510 (e.g., using one or more application programming interfaces (APIs) corresponding to the video streaming application(s) 504, for example). The network 510 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the server(s) 502 include one or more processors 512, as well as a database 514 that functions as a repository for the data that is generated and maintained according to embodiments described herein. Such data may include, but are not limited to, application data and video data, as described with respect to FIG. 4. In addition, the server(s) 502 include a computer-readable storage medium 516 including a geolocation-specific subtitle generation module 518 that directs the processor(s) 512 to provide for the streaming of a video with geolocation-specific subtitles during the execution of the video streaming application(s) 504 on the remote computing systems 506.

In some embodiments, the server(s) 502 maintains the code corresponding to the video streaming application(s) 504. In such embodiments, the server(s) 502 may host the video streaming application(s) 504 on the remote computing system(s) 506 via the network 510 (e.g., using the corresponding APIs). In particular, the server(s) 502 provide for execution of the video streaming application(s) 504 on the remote computing system(s) 506 by surfacing a video GUI 520 on a display 522 corresponding to each remote computing system 506. The video with the subtitles may then be streamed with respect to the video GUI 520, with a separate unit conversion GUI 524 including converted geolocation-specific subtitles being surfaced on top of the video GUI 520 and adjacent to the corresponding subtitles within the video, as described herein.

It is to be understood that the simplified block diagram of FIG. 5 is not intended to indicate that the network environment 500 is to include all of the components shown in FIG.

5. Rather, the network environment 500 may include different components and/or additional components not illustrated in FIG. 5. For example, in practice, the server(s) 502 will include a number of additional components not depicted in the simplified block diagram of FIG. 5, as described with respect to the computing system 400 of FIG. 4, for example.

Figure 6:
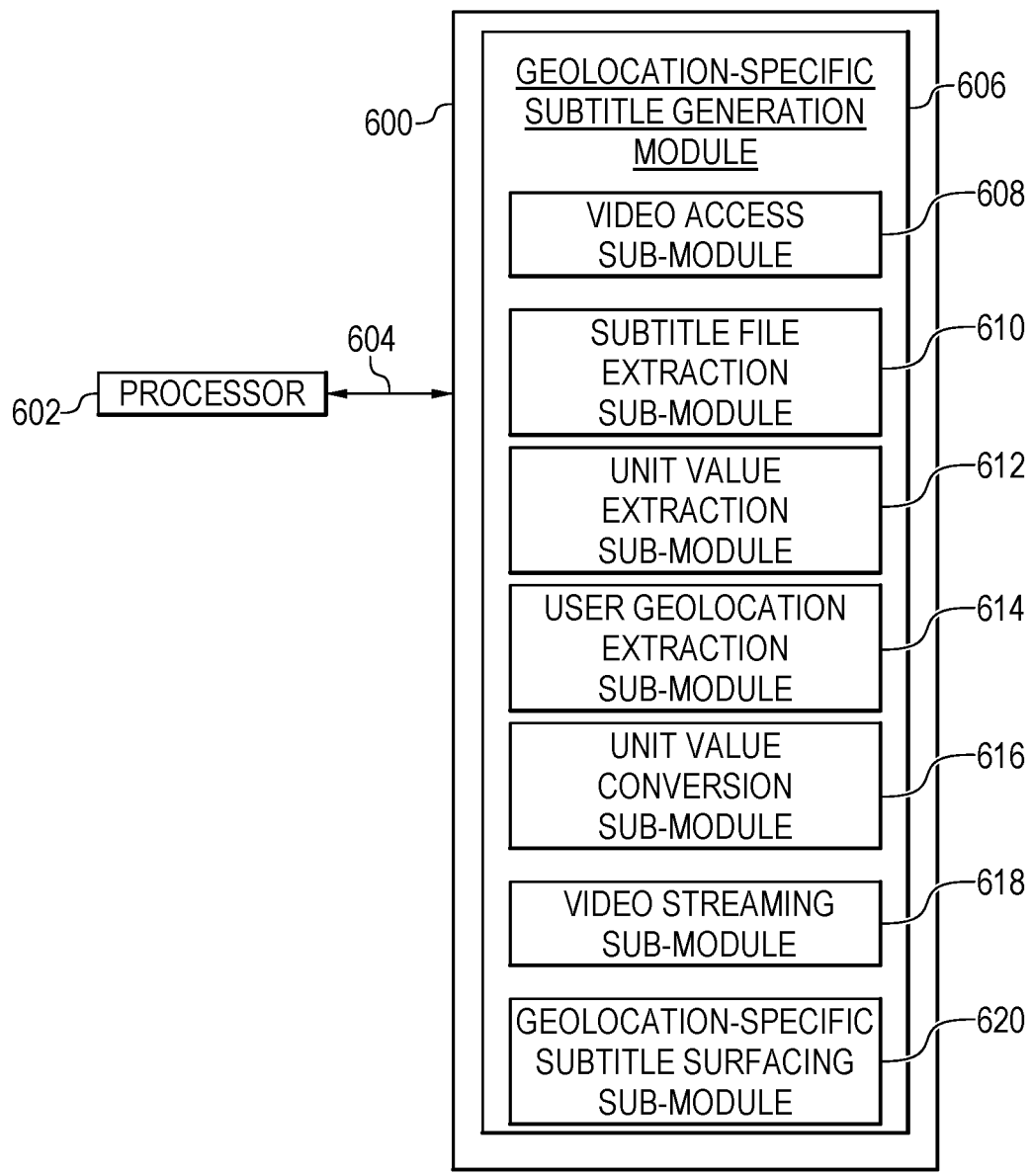
FIG. 6 is a block diagram of an exemplary computer-readable storage medium for implementing the geolocation-specific subtitle generation techniques described herein.

FIG. 6 is a block diagram of an exemplary computer-readable storage medium 600 for implementing the geolocation-specific subtitle generation techniques described herein. In various embodiments, the computer-readable storage medium 600 is accessed by a processor 602 over a computer interconnect 604. For example, in some embodiments, the computer-readable storage medium 600 is the same as, or similar to, the computer-readable storage medium described with respect to the computing system 400 of FIG. 4 and/or the network environment 500 of FIG. 5.

In various embodiments, the computer-readable storage medium 600 includes code (i.e., computer-executable instructions) to direct the processor 602 to perform the operations of the present techniques. Such code may be stored within the computer-readable storage medium 600 in the form of program modules, where each module includes a set of computer-executable instructions that, when executed by the processor 602, cause the processor 602 to perform a corresponding set of operations. In particular, in various embodiments, the computer-readable storage medium 600 includes a geolocation-specific subtitle generation module 606 that directs the processor 602 to perform the geolocation-specific subtitle generation techniques described herein. Moreover, in various embodiments, the geolocation-specific subtitle generation module 606 accomplishes this via one or more sub-modules. Such sub-modules may include, but are not limited to, a video access sub-module 608 that directs the processor 602 to access a video including an embedded subtitle file; a subtitle file extraction sub-module 610 that directs the processor 602 to extract the subtitle file from the video; a unit value extraction sub-module 612 that directs the processor 602 to extract unit values from the subtitle file; a user geolocation extraction sub-module 614 that directs the processor 602 to extract the geolocation of the user executing the video streaming application; a unit value conversion sub-module 616 that directs the processor 602 to convert the unit values within the subtitle file to geolocation-specific unit values using a unit conversion map; a video streaming sub-module 618 that directs the processor 602 to stream the video with the subtitles from the subtitle file on a video GUI of the video streaming application; and a geolocation-specific subtitle surfacing sub-module 620 that directs the processor 602 to, simultaneously with the streaming of the video, surface the geolocation-specific unit values within a unit conversion GUI of the video streaming application that is surfaced on top of the video GUI, as described herein with respect to the method 300 of FIG. 3, for example.

Moreover, those skilled in the art will appreciate that any suitable number of the modules shown in FIG. 5 may be included within the computer-readable storage medium 500. Furthermore, any number of additional modules/sub-modules not shown in FIG. 5 may be included within the computer-readable storage medium 500, depending on the details of the specific implementation.

The present techniques may be susceptible to various modifications and alternative forms, including (but not limited to) those described in the following examples:

Example 1 is a method for generating geolocation-specific subtitles for a video. The method is implemented in a computing system including a processor. The method includes: accessing, via the processor, a video including an embedded subtitle file; extracting the subtitle file from the video; extracting unit values from the subtitle file; extracting a geolocation of a user executing a video streaming application; converting the unit values within the subtitle file to geolocation-specific unit values using a unit conversion map, where the geolocation-specific unit values correspond to the extracted geolocation of the user; streaming the video with subtitles from the subtitle file on a video GUI of the video streaming application; and simultaneously with the streaming of the video, surfacing the geolocation-specific unit values within a unit conversion GUI of the video streaming application that is surfaced on top of the video GUI.

Example 2 includes the method of example 1, including or excluding optional features. In this example, the method includes, prior to accessing the video, generating the unit conversion map.

Example 3 includes the method of example 1 or 2, including or excluding optional features. In this example, the method includes surfacing the unit conversion GUI above, below, or next to the corresponding subtitles within the video GUI.

Example 4 includes the method of any one of examples 1 to 3, including or excluding optional features. In this example, the method includes visually highlighting the unit values within the subtitles to indicate the manner in which the geolocation-specific unit values correspond to the subtitles.

Example 5 includes the method of any one of examples 1 to 4, including or excluding optional features. In this example, the method includes extracting the unit values from the subtitle file by performing at least one of: automatically searching text with the subtitle file for common unit values using a plurality of predefined, regular expression (regex) search strings; or automatically analyzing the text within the subtitle file based on natural language processing to extract phrases relating to parameters that are typically expressed in terms of units.

Example 6 includes the method of any one of examples 1 to 5, including or excluding optional features. In this example, the method includes extracting the geolocation of the user executing the video streaming application by: accessing an IP address to extract a current geolocation of the user; or analyzing user identification information input by the user with respect to the video streaming application to extract a native geolocation of the user.

Example 7 includes the method of example 6, including or excluding optional features. In this example, the video streaming application is executed on the computing system implementing the method, and the IP address corresponds to such computing system.

Example 8 includes the method of example 6, including or excluding optional features. In this example, the computing system implementing the method causes the execution of the video streaming application, the streaming of the video, and the surfacing of the geolocation-specific unit values on a remote computing system that is operated by the user, and the IP address corresponds to such remote computing system.

Example 9 includes the method of any one of examples 1 to 8, including or excluding optional features. In this example, the method includes performing, via the processor, automatic speech-to-text conversion to generate the subtitle file for the video.

Example 10 includes the method of any one of examples 1 to 9, including or excluding optional features. In this example, the method includes automatically generating a number of geolocation-specific unit values for a number of corresponding geolocations using the unit conversion map; and storing the geolocation-specific unit values with respect to the subtitle file for subsequent streaming.

Example 11 includes the method of any one of examples 1 to 10, including or excluding optional features. In this example, the video includes a marketing video for a good or a service, and the unit values relate to at least one parameter of the marketed good or service.

Example 12 includes the method of any one of examples 1 to 11, including or excluding optional features. In this example, the video includes a live video, and the method is executed in real-time.

Example 13 includes the method of any one of examples 1 to 12, including or excluding optional features. In this example, the method includes activating or deactivating a geolocation-specific subtitle generation functionality of the video streaming application based at least on user input received via the video GUI, where the activation of the geolocation-specific subtitle generation functionality causes the surfacing of the geolocation-specific unit values with the unit conversion GUI and the deactivation of the geolocation-specific subtitle generation functionality causes the method to terminate prior to the surfacing of the geolocation-specific unit values within the unit conversion GUI.

Example 14 is a computing system. The computing system includes a processor and a computer-readable storage medium operatively coupled to the processor. The computer-readable storage medium includes computer-executable instructions that, when executed by the processor, cause the processor to: access a video including an embedded subtitle file; extract the subtitle file from the video; extract unit values from the subtitle file; extract a geolocation of a user executing a video streaming application; convert the unit values within the subtitle file to geolocation-specific unit values using a unit conversion map, where the geolocation-specific unit values correspond to the extracted geolocation of the user; stream the video with subtitles from the subtitle file on a video GUI of the video streaming application; and simultaneously with the streaming of the video, surface the geolocation-specific unit values within a unit conversion GUI of the video streaming application that is surfaced on top of the video GUI.

Example 15 includes the computing system of example 14, including or excluding optional features. In this example, the computing system further includes a communication connection for connecting a remote computing system that is operated by the user to the computing system via a network, and the computing system causes the execution of the video streaming application, the streaming of the video, and the surfacing of the geolocation-specific unit values on the remote computing system.

Example 16 includes the computing system of example 14 or 15, including or excluding optional features. In this example, the computer-readable storage medium includes computer-executable instructions that, when executed by the processor, cause the processor to surface the unit conversion GUI above, below, or next to the corresponding subtitles within the video GUI.

Example 17 includes the computing system of any one of examples 14 to 16, including or excluding optional features. In this example, the computer-readable storage medium includes computer-executable instructions that, when executed by the processor, cause the processor to visually highlight the unit values within the subtitles to indicate the manner in which the geolocation-specific unit values correspond to the subtitles.

Example 18 includes the computing system of any one of examples 14 to 17, including or excluding optional features. In this example, the computer-readable storage medium includes computer-executable instructions that, when executed by the processor, cause the processor to extract the unit values from the subtitle file by performing at least one of: automatically searching text with the subtitle file for common unit values using a plurality of predefined, regex search strings; or automatically analyzing the text within the subtitle file based on natural language processing to extract phrases relating to parameters that are typically expressed in terms of units.

Example 19 is a computer-readable storage medium. The computer-readable storage medium includes computer-executable instructions that, when executed by a processor, cause the processor to: access a video including an embedded subtitle file; extract the subtitle file from the video; extract unit values from the subtitle file; extract a geolocation of a user executing a video streaming application; convert the unit values within the subtitle file to geolocation-specific unit values using a unit conversion map, where the geolocation-specific unit values correspond to the extracted geolocation of the user; stream the video with subtitles from the subtitle file on a video graphical user interface (GUI) of the video streaming application; and simultaneously with the streaming of the video, surface the geolocation-specific unit values within a unit conversion GUI of the video streaming application that is surfaced on top of the video GUI.

Example 20 includes the computer-readable storage medium of example 19, including or excluding optional features. In this example, the computer-readable storage medium includes computer-executable instructions that, when executed by the processor, cause the processor to extract the unit values from the subtitle file by performing at least one of: automatically searching text with the subtitle file for common unit values using a plurality of predefined, regex search strings; or automatically analyzing the text within the subtitle file based on natural language processing to extract phrases relating to parameters that are typically expressed in terms of units.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors, and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for generating geolocation-specific subtitles for a video, wherein the method is implemented via a computing system comprising a processor, and wherein the method comprises:
    accessing, via the processor, a video comprising an embedded subtitle file;
    extracting the subtitle file from the video;
    extracting unit values from the subtitle file;
    extracting a geolocation of a user executing a video streaming application;
    converting the unit values within the subtitle file to geolocation-specific unit values using a unit conversion map, wherein the geolocation-specific unit values correspond to the extracted geolocation of the user;
    streaming the video with subtitles from the subtitle file on a video graphical user interface (GUI) of the video streaming application; and
    simultaneously with the streaming of the video, surfacing the geolocation-specific unit values within a unit conversion GUI of the video streaming application that is surfaced on top of the video GUI.

2. The method of claim 1, comprising, prior to accessing the video, generating the unit conversion map.

3. The method of claim 1, comprising surfacing the unit conversion GUI above, below, or next to the corresponding subtitles within the video GUI.

4. The method of claim 1, comprising visually highlighting the unit values within the subtitles to indicate the manner in which the geolocation-specific unit values correspond to the subtitles.

5. The method of claim 1, comprising extracting the unit values from the subtitle file by performing at least one of:
    automatically searching text with the subtitle file for common unit values using a plurality of predefined, regular expression (regex) search strings; or
    automatically analyzing the text within the subtitle file based on natural language processing to extract phrases relating to parameters that are typically expressed in terms of units.

6. The method of claim 1, comprising extracting the geolocation of the user executing the video streaming application by:
    accessing an IP address to extract a current geolocation of the user; or
    analyzing user identification information input by the user with respect to the video streaming application to extract a native geolocation of the user.

7. The method of claim 6, wherein the video streaming application is executed on the computing system implementing the method, and wherein the IP address corresponds to the computing system.

8. The method of claim 6, wherein the computing system implementing the method causes the execution of the video streaming application, the streaming of the video, and the surfacing of the geolocation-specific unit values on a remote computing system that is operated by the user, and wherein the IP address corresponds to the remote computing system.

9. The method of claim 1, comprising performing, via the processor, automatic speech-to-text conversion to generate the subtitle file for the video.

10. The method of claim 1, comprising:
    automatically generating a plurality of geolocation-specific unit values for a plurality of corresponding geolocations using the unit conversion map; and
    storing the plurality of geolocation-specific unit values with respect to the subtitle file for subsequent streaming.

11. The method of claim 1, wherein the video comprises a marketing video for a good or a service, and wherein the unit values relate to at least one parameter of the marketed good or service.

12. The method of claim 1, wherein the video comprises a live video, and wherein the method is executed in real-time.

13. The method of claim 1, comprising activating or deactivating a geolocation-specific subtitle generation functionality of the video streaming application based at least on user input received via the video GUI, wherein the activation of the geolocation-specific subtitle generation functionality causes the surfacing of the geolocation-specific unit values with the unit conversion GUI and the deactivation of the geolocation-specific subtitle generation functionality causes the method to terminate prior to the surfacing of the geolocation-specific unit values within the unit conversion GUI.

14. A computing system, comprising:
    a processor; and
    a computer-readable storage medium operatively coupled to the processor, the computer-readable storage medium comprising computer-executable instructions that, when executed by the processor, cause the processor to:
    access a video comprising an embedded subtitle file;
    extract the subtitle file from the video;
    extract unit values from the subtitle file;
    extract a geolocation of a user executing a video streaming application;
    convert the unit values within the subtitle file to geolocation-specific unit values using a unit conversion map, wherein the geolocation-specific unit values correspond to the extracted geolocation of the user;
    stream the video with subtitles from the subtitle file on a video graphical user interface (GUI) of the video streaming application; and
    simultaneously with the streaming of the video, surface the geolocation-specific unit values within a unit conversion GUI of the video streaming application that is surfaced on top of the video GUI.

15. The computing system of claim 14, wherein the computing system further comprises a communication connection for connecting a remote computing system that is operated by the user to the computing system via a network, and wherein the computing system causes the execution of the video streaming application, the streaming of the video, and the surfacing of the geolocation-specific unit values on the remote computing system.

16. The computing system of claim 14, wherein the computer-readable storage medium comprises computer-executable instructions that, when executed by the processor, cause the processor to surface the unit conversion GUI above, below, or next to the corresponding subtitles within the video GUI.

17. The computing system of claim 14, wherein the computer-readable storage medium comprises computer-executable instructions that, when executed by the processor, cause the processor to visually highlight the unit values within the subtitles to indicate the manner in which the geolocation-specific unit values correspond to the subtitles.

18. The computing system of claim 14, wherein the computer-readable storage medium comprises computer-executable instructions that, when executed by the processor, cause the processor to extract the unit values from the subtitle file by performing at least one of:
    automatically searching text with the subtitle file for common unit values using a plurality of predefined, regular expression (regex) search strings; or
    automatically analyzing the text within the subtitle file based on natural language processing to extract phrases relating to parameters that are typically expressed in terms of units.

19. A computer-readable storage medium comprising computer-executable instructions that, when executed by a processor, cause the processor to:
    access a video comprising an embedded subtitle file;
    extract the subtitle file from the video;
    extract unit values from the subtitle file;
    extract a geolocation of a user executing a video streaming application;
    convert the unit values within the subtitle file to geolocation-specific unit values using a unit conversion map, wherein the geolocation-specific unit values correspond to the extracted geolocation of the user;
    stream the video with subtitles from the subtitle file on a video graphical user interface (GUI) of the video streaming application; and
    simultaneously with the streaming of the video, surface the geolocation-specific unit values within a unit conversion GUI of the video streaming application that is surfaced on top of the video GUI.

20. The computer-readable storage medium of claim 19, wherein the computer-readable storage medium comprises computer-executable instructions that, when executed by the processor, cause the processor to extract the unit values from the subtitle file by performing at least one of:
    automatically searching text with the subtitle file for common unit values using a plurality of predefined, regular expression (regex) search strings; or
    automatically analyzing the text within the subtitle file based on natural language processing to extract phrases relating to parameters that are typically expressed in terms of units.

* * * * *